(12) United States Patent
Asao et al.

(10) Patent No.: US 6,326,715 B1
(45) Date of Patent: Dec. 4, 2001

(54) STATOR FOR AN AUTOMOTIVE ALTERNATOR

(75) Inventors: Yoshihito Asao; Kyoko Higashino, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,918

(22) Filed: May 17, 2000

(30) Foreign Application Priority Data

Dec. 1, 1999 (JP) .................................................. 11-342108

(51) Int. Cl.⁷ ...................................................... H02K 3/00
(52) U.S. Cl. .......................... 310/180; 310/184; 310/206; 310/71
(58) Field of Search ................................... 310/180, 184, 310/195, 201, 206, 71

(56) References Cited

U.S. PATENT DOCUMENTS 5,982,068 * 11/1999 Umeda et al. ........................ 310/206
6,204,586 * 3/2001 Umeda et al. ........................ 310/179

FOREIGN PATENT DOCUMENTS 11-164506 6/1999 (JP) .................................. H02K/3/50
92-06527 * 4/1992 (WO) .............................. H02K/3/12

* cited by examiner

Primary Examiner—Burton S. Mullins
(74) Attorney, Agent, or Firm—Sughrue, Mion, Zinn, Macpeak & Seas, PLLC (57) ABSTRACT

A stator for an automotive alternator includes a stator core having a number of slots, and a polyphase stator winding installed in the slots, the stator winding being constructed by joining a number of segments of electric conductor, and the stator winding includes a second coil-end portion formed at a first axial end of the stator core, the second coil-end portion being constituted by turn portions of the segments, and a first coil-end portion formed at a second axial end of the stator core, the first coil-end portion being constructed by joining end portions of the segments so as to form a lap winding, each phase of the stator winding being constructed by forming a bridging connection between first and second winding sub-portions each constituting two turns of a lap winding per circumnavigation of the stator core, and the segments of each phase of the stator winding constituting a bridging connection connecting portion between the first and second winding sub-portions, a lead point, and a neutral point being disposed in a portion extending over a pitch of two magnetic poles of a selected coil-end portion selected from the first and second coil-end portions.

16 Claims, 11 Drawing Sheets

SOLID LINES : WIRES AT NON-CONNECTION SIDE (REAR SIDE)
DOTTED LINES : WIRES AT CONNECTION SIDE (FRONT SIDE)

⊙ : DIRECTION FROM FRONT SIDE TO REAR SIDE

⊗ : DIRECTION FROM REAR SIDE TO FRONT SIDE

SOLID LINES : WIRES AT NON-CONNECTION SIDE (REAR SIDE)
DOTTED LINES : WIRES AT CONNECTION SIDE (FRONT SIDE)

⊙ : DIRECTION FROM FRONT SIDE TO REAR SIDE

⊗ : DIRECTION FROM REAR SIDE TO FRONT SIDE

FIG. 12

SOLID LINES : WIRES AT NON-CONNECTION SIDE (REAR SIDE)
DOTTED LINES : WIRES AT CONNECTION SIDE (FRONT SIDE)

⊙ : DIRECTION FROM FRONT SIDE TO REAR SIDE

⊗ : DIRECTION FROM REAR SIDE TO FRONT SIDE

FIG. 13
PRIOR ART

SOLID LINES : WIRES AT NON-CONNECTION SIDE (REAR SIDE)
DOTTED LINES : WIRES AT CONNECTION SIDE (FRONT SIDE)

⊙ : DIRECTION FROM FRONT SIDE TO REAR SIDE

⊗ : DIRECTION FROM REAR SIDE TO FRONT SIDE

STATOR FOR AN AUTOMOTIVE ALTERNATOR

BACKGROUND OF THE INVENTION

1. Field of the Invention

The present invention relates to an alternator driven by an internal combustion engine, and in particular, relates to a stator for an automotive alternator mounted to a vehicle such as a passenger car or a truck.

2. Description of the Related Art

Conventionally, a stator winding in a stator for an automotive alternator is manufactured by preparing an annular coil by winding continuous wire into an annular shape, preparing a star shape coil by deforming this annular coil into a star shape, and then installing straight portions of this star shape coil into slots in a stator core. However, excessive stress is applied to the wire when installing the star shape coil in the slots of the stator core, increasing the likelihood of wire breakage or insulation defects, and productivity has been markedly inferior.

Thus, in order to solve such deficiencies, a method for manufacturing stator windings by first bending an electric conductor into U-shaped segments and inserting a number of these segments into the slots in the stator core, and then joining end portions of these segments extending outwards from the slots, has been proposed in Japanese Patent Laid-Open No. HEI 11-164506, for example.

Figure 13:
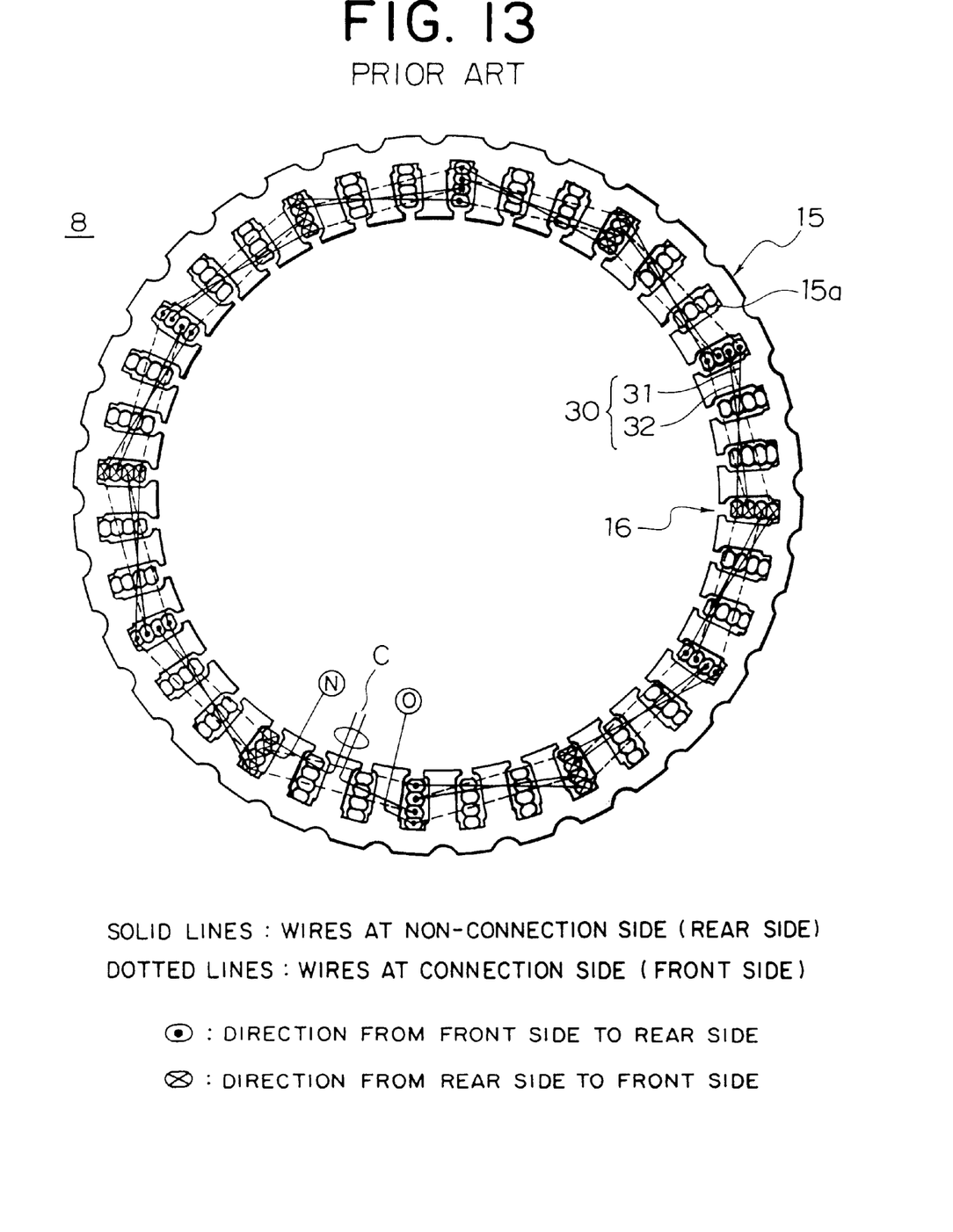
FIG. 13 is a plan view from a rear end showing connection of one phase of a stator winding in a stator used in a conventional automotive alternator.
Figure 14:
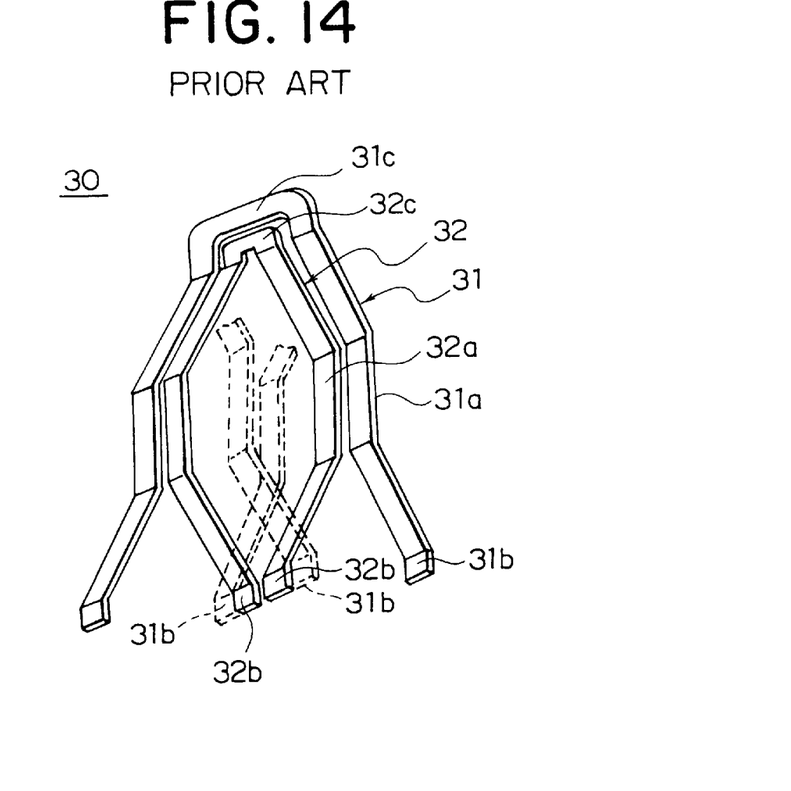
FIG. 14 is a perspective schematically showing segments constituting the stator winding in the conventional stator.
Figure 15:
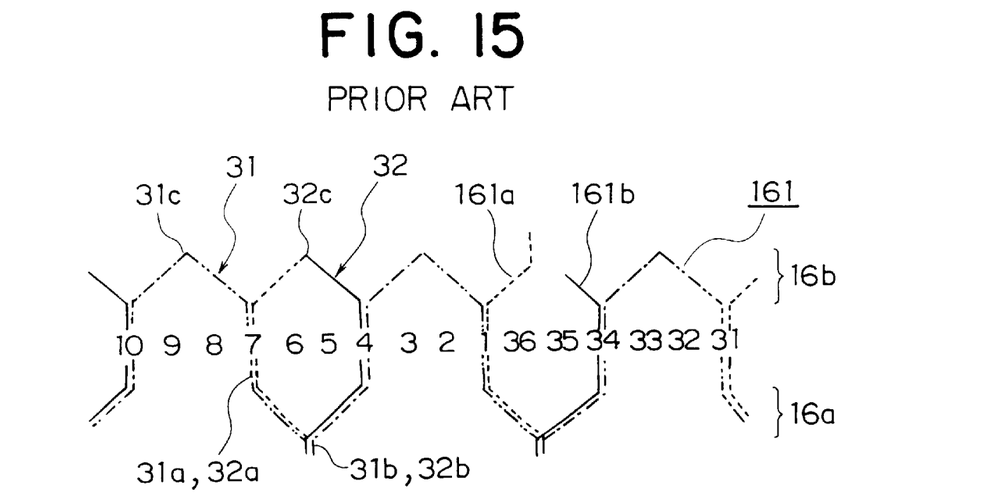
FIG. 15 is a developed projection showing part of the connection of one phase of the stator winding in the conventional stator.
Figure 16:
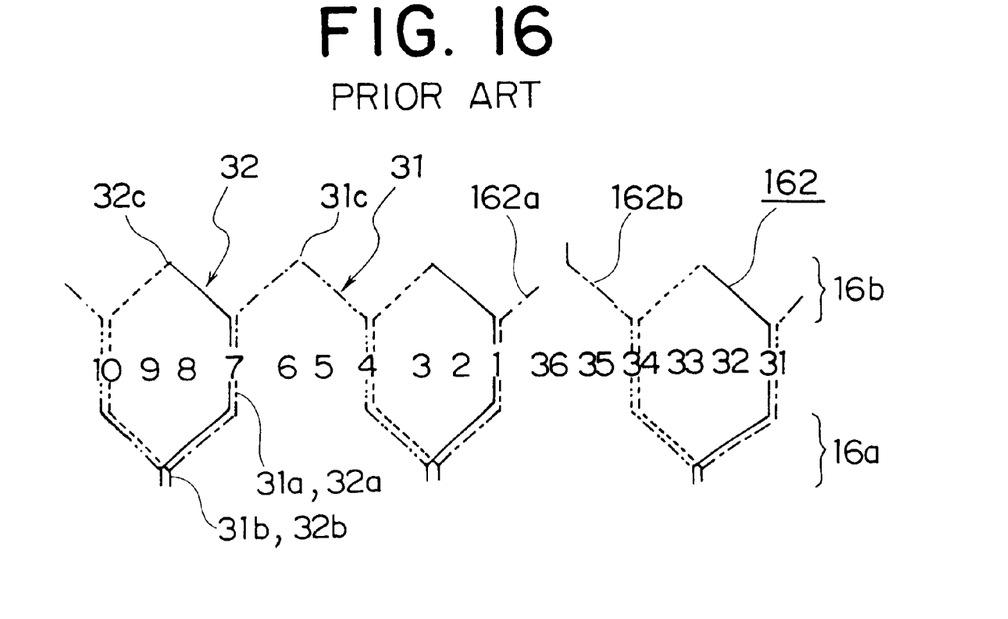
FIG. 16 is a developed projection showing part of the connection of one phase of the stator winding in the conventional stator.
Figure 17:
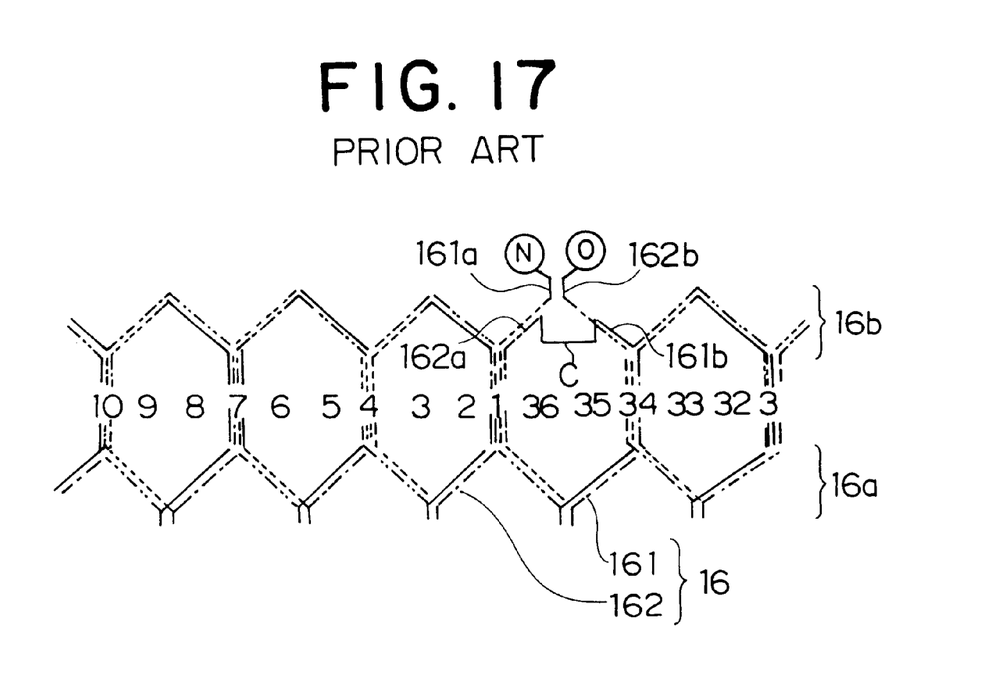
FIG. 17 is a developed projection showing part of the connection of one phase of the stator winding in the conventional stator.

FIG. 13 is a plan showing connection of one phase of a stator winding in the stator for an automotive alternator disclosed in Japanese Patent Laid-Open No. HEI 11-164506, for example, FIG. 14 is a schematic perspective of segments constituting the stator winding, and FIGS. 15 to 17 are developed projections each showing a portion of the connections of one phase of the stator winding.

The stator 8 in FIG. 13 includes: a stator core 15; and a stator winding 16 composed of a number of segments 30 arranged in slots 15a formed in the stator core 15. In this case, thirty-six slots 15a are formed in the stator core 15 at even pitch so as to house three phases of windings therein corresponding with the number (12) of magnetic poles in a rotor (not shown).

The segments 30 are inserted two at a time from a first axial end of the stator core 15 into pairs of slots 15a which are three slots apart (a pitch of one magnetic pole). Then, the stator winding 16 is constructed by joining end portions of the segments 30 extending outwards from a second axial end of the stator 15 in a predetermined pattern. Moreover, the segments 30 are accommodated so as to line up in a row of four in a radial direction within each slot 15a. Hereinafter, the four segment accommodating positions lined up in the radial direction within each slot 15a will be numbered from an outer circumferential side as first, second, third, and fourth positions, respectively.

As shown in FIG. 14, large segments 31 and small segments 32, each composed of an electric conductor such as insulated copper having a rectangular cross section formed into a general U shape, are used for the segments 30.

The small segments 32 are inserted from the first axial end into the second positions within first slots 15a and into the third positions within second slots 15a three slots away from the first slots 15a in a clockwise direction in FIG. 13. The large segments 31 are similarly inserted from the first axial end into the first positions within the first slots 15a and into the fourth positions within the second slots 15a three slots away from the first slots 15a in the clockwise direction in FIG. 13. Thus, straight portions 31a and 32a of the large and small segments 31 and 32 are arranged so as to line up in a row in a radial direction within each of the slots 15a.

At the first axial end of the stator core 15, turn portions 31c of the large segments 31 surround outer circumferential sides of turn portions 32c of the small segments 32 inserted into the same pairs of slots 15a. The turn portions 31c and 32c are arranged to line up in rows in a circumferential direction and constitute a second coil-end portion 16b.

At the second axial end of the stator core 15, end portions 32b of the small segments 32 extending outwards from the second axial end from the second positions within the first slots 15a are joined to end portions 31b of the large segments 31 extending outwards from the second axial end from the first positions within the second slots 15a three slots away from the first slots 15a in the clockwise direction in FIG. 13, and end portions 31b of the large segments 31 extending outwards from the second axial end from the fourth positions within the first slots 15a are joined to end portions 32b of the small segments 32 extending outwards from the second axial end from the third positions within the second slots 15a three slots away from the first slots 15a in the clockwise direction in FIG. 13. The joint portions formed by joining the end portions 32b of the small segments 32 extending outwards from the second axial end from the second positions within the slots 15a to the end portions 31b of the large segments 31 extending outwards from the second axial end from the first positions within the slots 15a and the joint portions formed by joining the end portions 31b of the large segments 31 extending outwards from the second axial end from the fourth positions within the slots 15a to the end portions 32b of the small segments 32 extending outwards from the second axial end from the third positions within the slots 15a line up radially, are arranged to line up in rows in a circumferential direction and constitute a first coil-end portion 16a.

The method of winding one phase (the X phase) of the stator winding 16 will now be explained with reference to FIGS. 15 to 17. Moreover, in each of the figures, electric conductors disposed on the outermost circumference in a radial direction are represented by doubledotted chain lines, electric conductors disposed in the second position from the outer circumference in the radial direction are represented by solid lines, electric conductors disposed in the third position from the outer circumference in the radial direction are represented by broken lines, and electric conductors disposed in the fourth position from the outer circumference in the radial direction are represented by, a single-dotted chain lines. Furthermore, the upper level represents the second coil-end portion 16b composed of arranged turn portions, and the lower level represents the first coil-end portion 16a composed of arranged joint portions. The horizontal row of numbers in the center of each diagram are slot numbers.

First, as shown in FIG. 15, large and small segments 31 and 32 are inserted into every third slot from slot number 1. In the first coil-end portion 16a, the end portions 32b of the small segments 32 extending outwards from the second positions within the first slots 15a are joined to the end portions 31b of the large segments 31 extending outwards from the first positions of the second slots 15a three slots away in the clockwise direction in FIG. 13, and end portions 31b of the large segments 31 extending outwards from the fourth positions of the first slots 15a are joined to end portions 32b of the small segments 32 extending outwards from the third positions of the second slots 15a three slots away in the clockwise direction in FIG. 13. Then, the turn portions 31c and 32c of the large and small segments 31 and 32 inserted into slot numbers 1 and 34 are cut.

In this manner, a lap-wound first winding sub-portion 161 is formed having two turns per slot. At the same time, a lap-wound second winding sub-portion 162 is formed having two turns per slot as shown in FIG. 16. As shown in FIG. 17, the first and second winding sub-portions 161 and 162 are joined (by a bridging connection) between a second end portion 161b of the first winding sub-portion 161 and a first end portion 162a of the second winding sub-portion 162 to form one phase of the stator winding 16, the phase having four turns. A first end portion 161a of the first winding sub-portion 161 and a second end portion 162b of the second winding subportion 162 become a lead wire (O) and a neutral point (N) respectively.

Moreover, the cut ends of the large segment 31 correspond to the end portions 162a and 162b of the second winding sub-portion 162, and the cut ends of the small segment 32 correspond to the end portions 161a and 161b of the first winding sub-portion 161. Furthermore, the joint portion formed by joining the second end portion 161b of the first winding sub-portion 161 to the first end portion 162a of the second winding sub-portion 162 becomes a bridging connection connecting portion (C).

In addition, two other phases (Y and Z) of the stator winding 16 are offset by one slot and manufactured similarly.

Then, the three phases of the stator winding 16 are formed into an alternating current connection by connecting the neutral points (N) of each phase of the stator winding 16 to each other and connecting the lead wires (O) to a rectifier (not shown).

Now, because the end portions 161a and 161b of the first winding sub-portion 161 and the end portions 162a and 162b of the second winding sub-portion 162 are obtained by cutting the turn portions 31c and 32c of large segments 31 and small segments 32, the segments constituting the end portions 161a and 161b of the first winding sub-portion 161 and the end portions 162a and 162b of the second winding sub-portion 162 are different from the other large segments 31 and small segments 32. In other words, each phase of the stator winding 16 has four differently-shaped segments disposed two at a time into pairs of slots separated by the pitch of one magnetic pole. After the turn portions 31c and 32c of some of the large segments 31 and some of the small segments 32 are cut, these differently-shaped segments are formed into bridging connections or three-phase alternating current connections.

As explained above, in this conventional stator 8 for an automotive alternator, each phase of the stator winding 16 has four differently-shaped segments disposed two at a time into pairs of slots separated by the pitch of one magnetic pole. When these differently-shaped segments are formed into bridging connections or three-phase alternating current connections or connected to the rectifier after the turn portions 31c and 32c of some of the large segments 31 and some of the small segments 32 are cut, twisting, pulling, etc., are applied to the differently-shaped segments, leading to a risk of the insulation on the electric conductors in the slots 15a or the insulation on the electric conductors constituting the coil ends being damaged, and one problem has been that short circuiting arises easily, reducing quality.

Furthermore, another problem has been that because the first winding sub-portion 161 and the second winding sub-portion 162 are not formed in the same shape, the same processing jig cannot be used for both the lead wire (O) and the neutral point (N), reducing productivity.

SUMMARY OF THE INVENTION

The present invention aims to solve the above problems and an object of the present invention is to provide a stator for an automotive alternator enabling the suppression of damage to the insulation of electric conductors which occurs during formation of the bridging connections and the three-phase alternating connection and the suppression of deterioration in quality due to short circuiting by spreading the bridging connection connecting portions between the lap-wound first and second winding sub-portions constituting each phase of the stator winding over a pitch of two magnetic poles, and also enabling productivity to be improved by enabling common use of one processing jig for the lead wire end and the neutral point end by forming the first and second winding sub-portions into exactly the same shape as each other.

In order to achieve the above object, according to one aspect of the present invention, there is provided a stator for an automotive alternator including:

a stator core having a number of slots; and a polyphase stator winding installed in the slots, the stator winding being constructed by joining a number of segments of electric conductor, the stator winding including:

a second coil-end portion formed at a first axial end of the stator core, the second coil-end portion being constituted by turn portions of the segments; and a first coil-end portion formed at a second axial end of the stator core, the first coil-end portion being constructed by joining end portions of the segments so as to form a lap winding, each phase of the stator winding being constructed by forming a bridging connection between first and second winding sub-portions each constituting two turns of a lap winding per circumnavigation of the stator core, and the segments of each phase of the stator winding constituting a bridging connection connecting portion between the first and second winding sub-portions, a lead point, and a neutral point being disposed in a portion extending over a pitch of two magnetic poles of a selected coil-end portion selected from the first and second coil-end portions.

DETAILED DESCRIPTION OF THE PREFERRED EMBODIMENTS

The preferred embodiments of the present invention will now be explained with reference to the diagrams.

Embodiment 1

Figure 1:
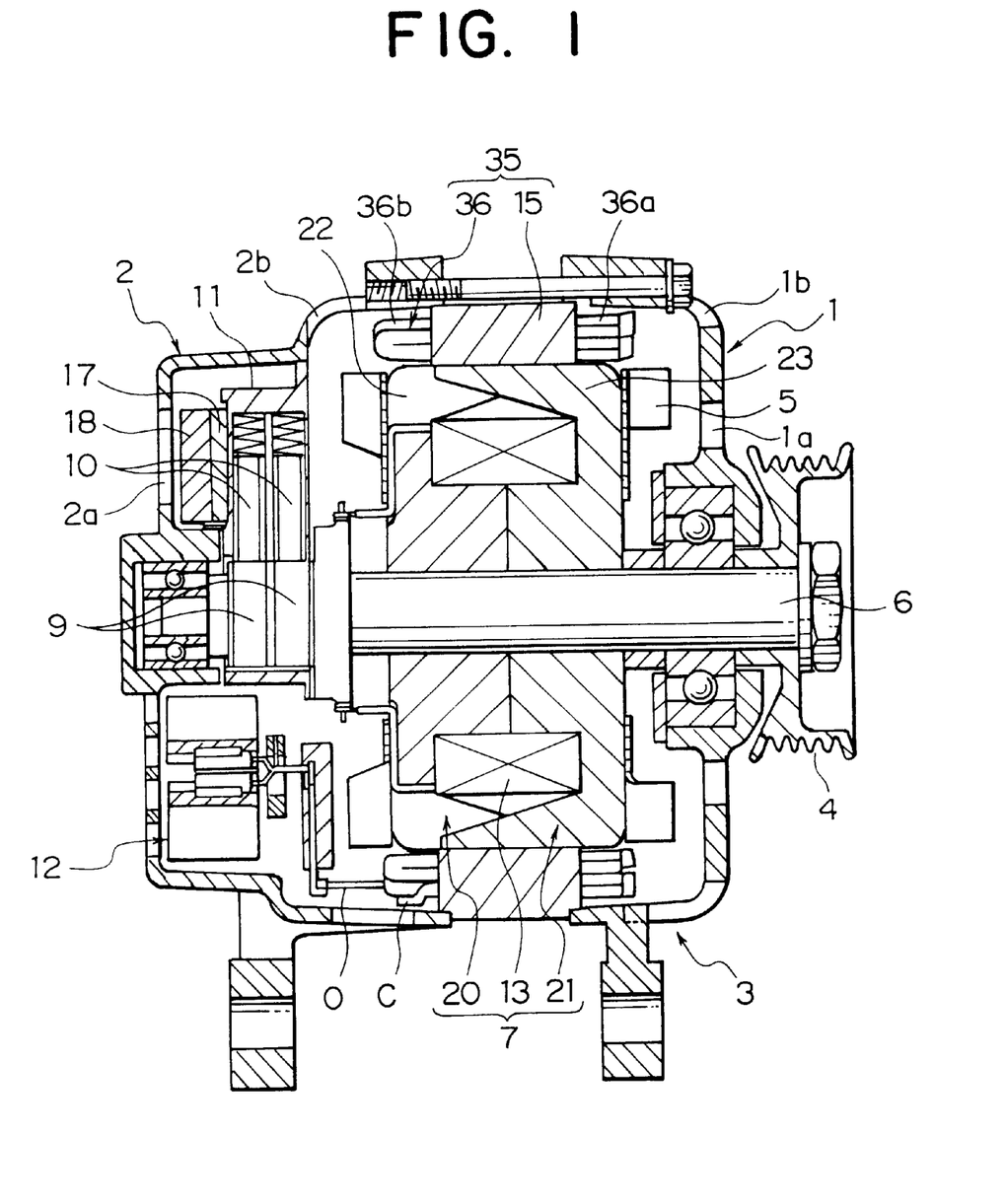
FIG. 1 is a cross section showing construction of an automotive alternator using a stator according to Embodiment 1 of the present invention.
Figure 2:
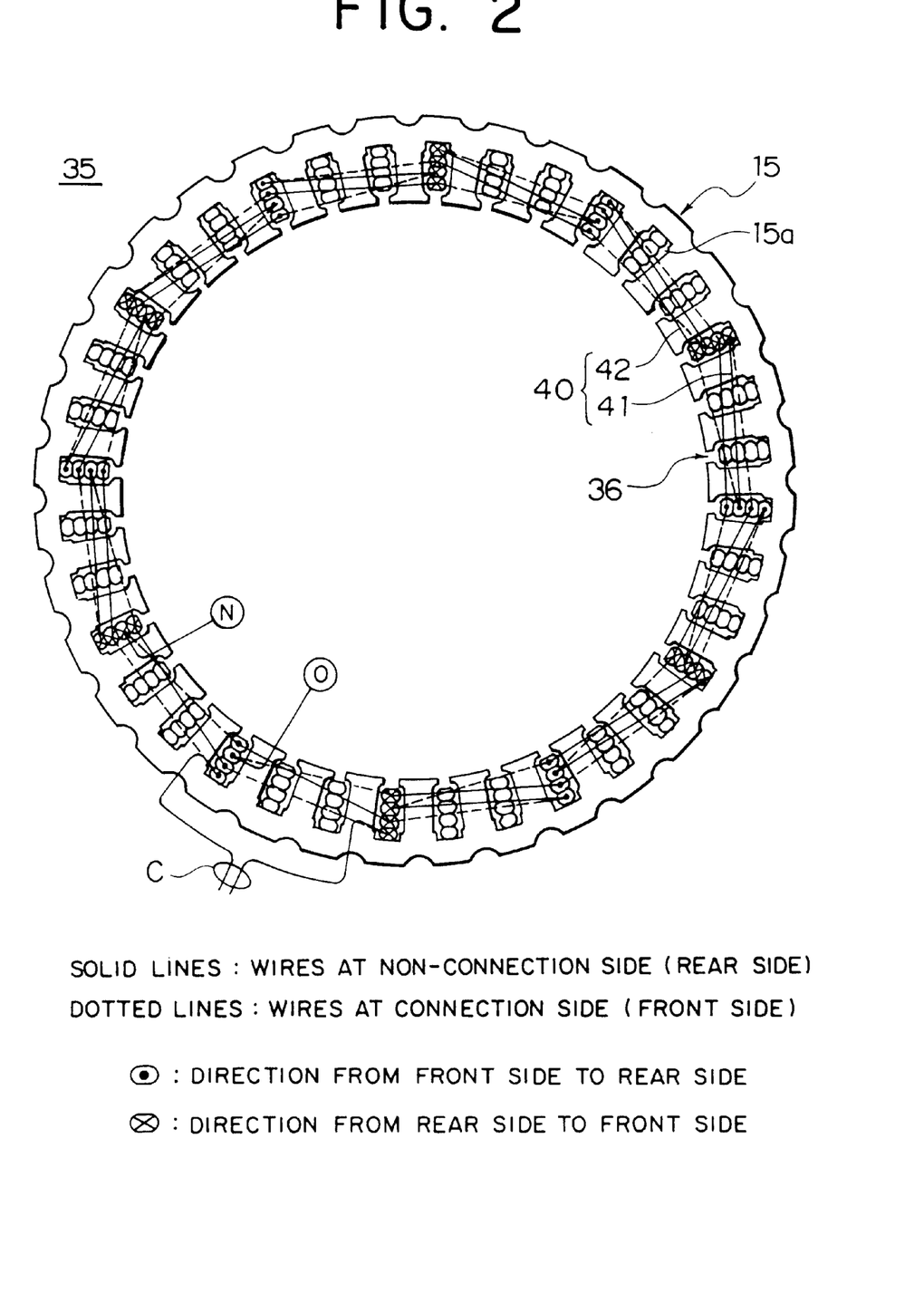
FIG. 2 is a plan view from a rear end showing connection of one phase of a stator winding in the stator according to Embodiment 1 of the present invention.
Figure 3:
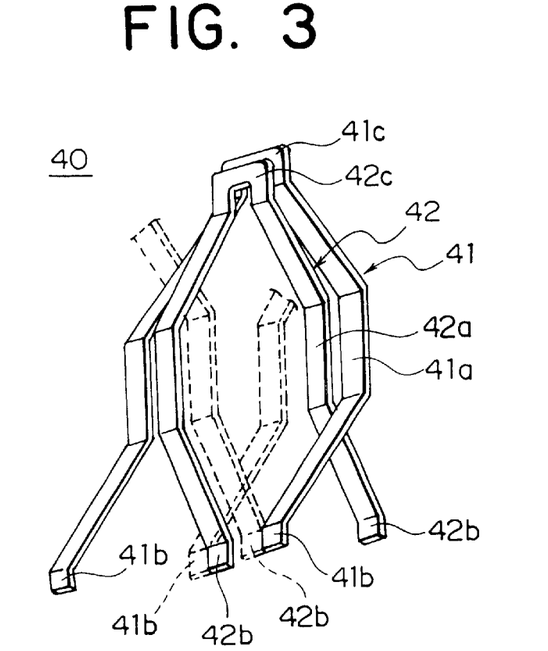
FIG. 3 is a perspective schematically showing segments constituting the stator winding in the stator according to Embodiment 1 of the present.invention.
Figure 4:
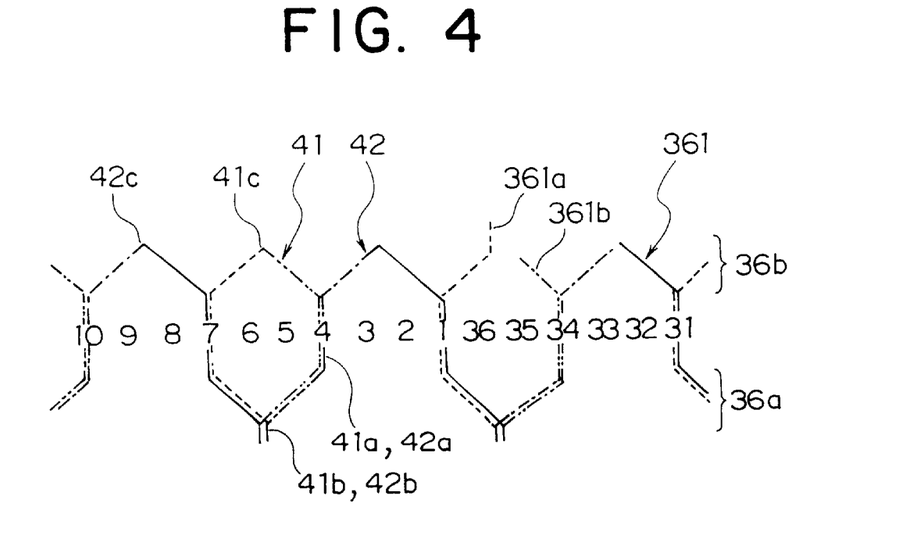
FIG. 4 is a developed projection showing part of the connection of one phase of the stator winding in the stator according to Embodiment 1 of the present invention.
Figure 5:
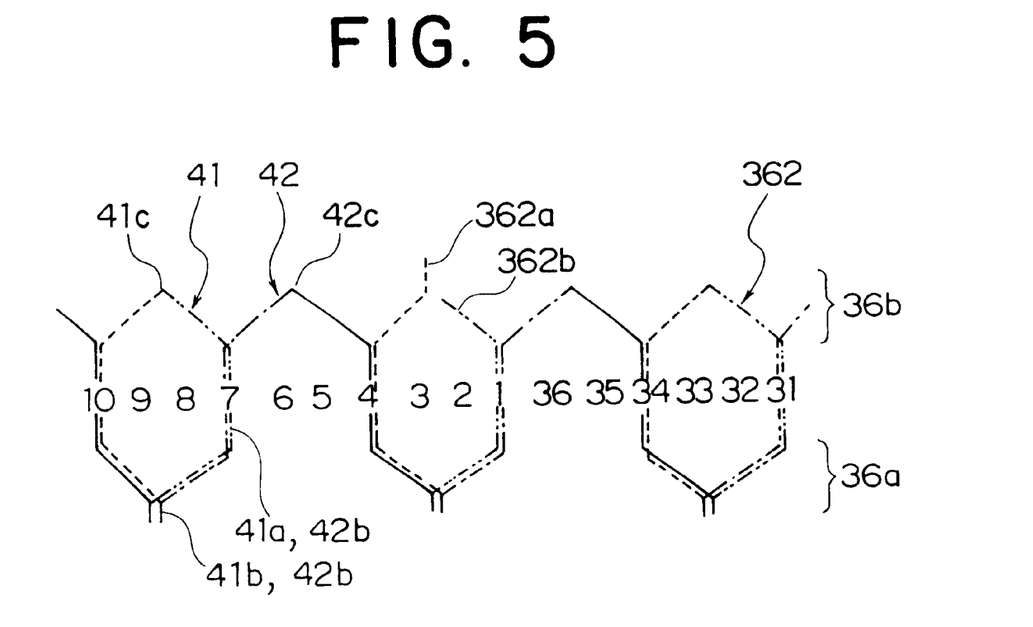
FIG. 5 is a developed projection showing part of the connection of one phase of the stator winding in the stator according to Embodiment 1 of the present invention.
Figure 6:
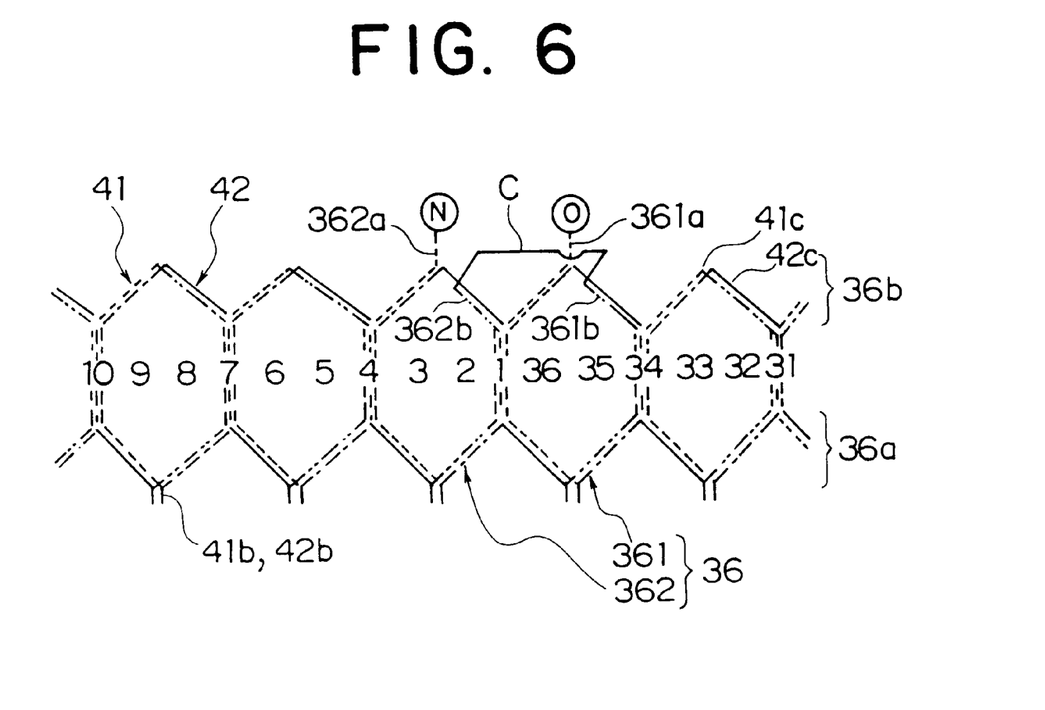
FIG. 6 is a developed projection showing part of the connection of one phase of the stator winding in the stator according to Embodiment 1 of the present invention.
Figure 7:
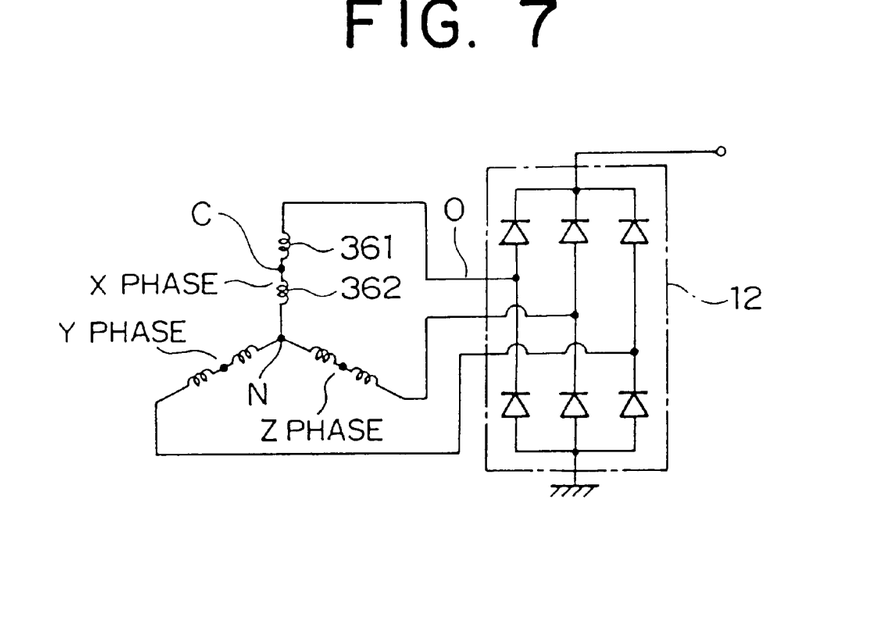
FIG. 7 is a circuit diagram for an automotive alternator using the stator according to Embodiment 1 of the present invention.
Figure 8:
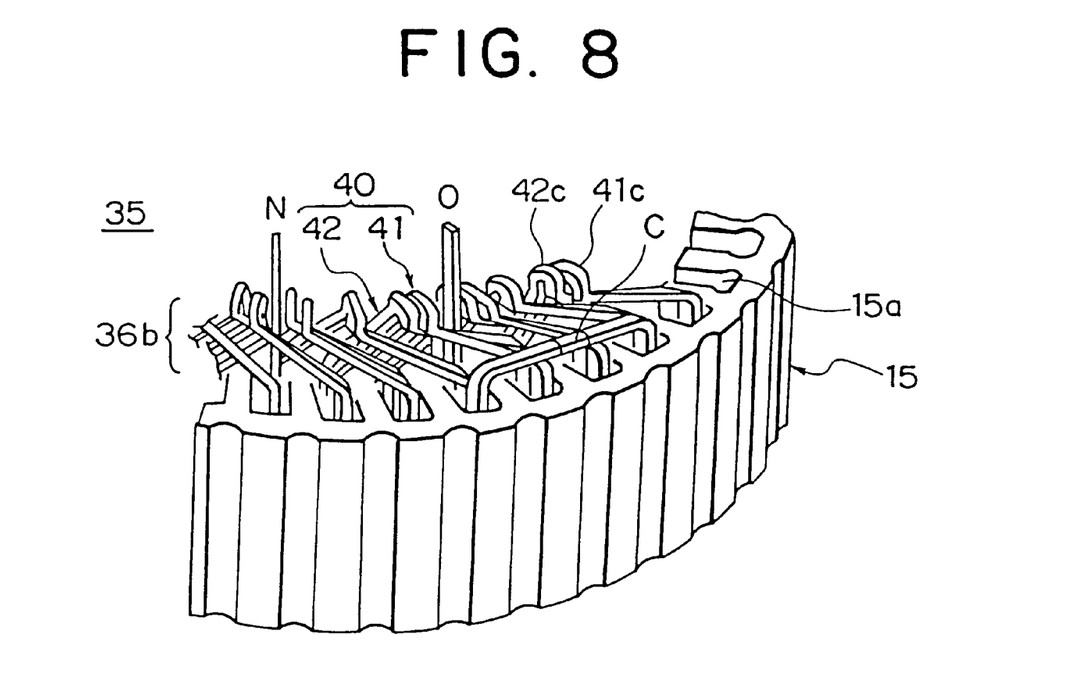
FIG. 8 is a perspective view from the rear end of part of the stator according to Embodiment 1 of the present invention.

FIG. 1 is a cross section showing construction of an automotive alternator using a stator according to Embodiment 1 of the present invention, FIG. 2 is a plan showing connection of one phase of a stator winding in the stator in the automotive alternator shown in FIG. 1, FIG. 3 is a schematic perspective showing segments constituting the stator winding, FIGS. 4 to 6 are developed projections each showing part of the connection of one phase of the stator winding, FIG. 7 is a circuit diagram for an automotive alternator according to Embodiment 1 of the present invention, and FIG. 8 is a perspective view from a rear end of part of the stator according to Embodiment 1 of the present invention.

The automotive alternator in FIG. 1 includes: a Lundell-type rotor 7 rotatably mounted by means of a shaft 6 within a case 3 consisting of an aluminum front bracket 1 and an aluminum rear bracket 2; and a stator 35 secured to an inner wall of the case 3 so as to cover an outer circumferential side of the rotor 7.

The shaft 6 is rotatably supported by the front bracket 1 and the rear bracket 2. A pulley 4 is secured to a first end of the shaft 6 to enable rotational torque from an engine to be transmitted to the shaft 6 by means of a belt (not shown).

Slip rings 9 for supplying electric current to the rotor 7 are secured to a second end of the shaft 6, and a pair of brushes 10 are housed in a brush holder 11 disposed within the case 3 so as to slide in contact with the slip rings 9. A regulator 18 for regulating the output voltage of the stator 35 is affixed by adhesive to a heat sink 17 attached to the brush holder 11. A rectifier 12 electrically connected to the stator 35 for rectifying an alternating current generated in the coil of the stator 35 into direct current is mounted within the case 3.

The rotor 7 includes: a rotor coil 13 which generates magnetic flux when an electric current flows therein; and a pair of pole cores 20, 21 disposed so as to cover the rotor coil 13, magnetic poles being formed in the pair of pole cores 20, 21 by the magnetic flux generated by the rotor coil 13. The pair of pole cores 20, 21 are made of iron, each has a plurality of claw-shaped magnetic poles 22, 23 projecting from an outer circumferential edge thereof spaced at even angular pitch circumferentially, and the pole cores 20, 21 are secured to the shaft 6 facing each other so that the claw-shaped magnetic poles 22, 23 intermesh. In addition, fans 5 are secured to both axial ends of the rotor 7.

Air intake openings 1a and 2a are disposed in axial end surfaces of the front bracket 1 and the rear bracket 2, and air discharge openings 1b and 2b disposed in outer circumferential shoulder portions of the front bracket 1 and the rear bracket 2 opposite the radial outside of first and second coil-end portions 36a and 36b of a stator winding 36.

As shown in FIG. 2, the stator 35 includes: a stator core 15; and a stator winding 36 composed of a number of segments 40 arranged in slots 15a formed in the stator core 15. In this case, thirty-six slots 15a are formed in the stator core 15 at even pitch so as to house three phases of windings therein corresponding with the number (12) of magnetic poles in a rotor 7.

The segments 40 are inserted two at a time from a rear end of the stator core 15 into pairs of slots 15a which are three slots apart (a pitch of one magnetic pole). Then, the stator winding 36 is constructed by joining end portions of the segments 40 extending outwards from a front end of the stator 15 in a predetermined pattern. Moreover, the segments 40 are accommodated so as to line up in a row of four in a radial direction within each slot 15a. Hereinafter, the four segment accommodating positions lined up in the radial direction within each slot 15a will be numbered from an outer circumferential side as first, second, third, and fourth positions, respectively.

As shown in FIG. 3, first segments 41 and second segments 42, each composed of an electric conductor such as insulated copper having a rectangular cross section formed into a general U shape, are used for the segments 40.

The first segments 41 are inserted from the rear end into the first positions within first slots 15a and into the third positions within second slots 15a three slots away from the first slots 15a in a clockwise direction in FIG. 2. The second segments 42 are similarly inserted from the rear end into the second positions within the first slots 15a and into the fourth positions within the second slots 15a three slots away from the first slots 15a in the clockwise direction in FIG. 2. Thus, straight portions 41a and 42a of the first and second segments 41 and 42 are arranged so as to line up in a row in a radial direction within each of the slots 15a.

At the rear end of the stator core 15, turn portions 41c of the first segment 41 and turn portions 42c of the second segment 42 are mutually parallel and mutually spaced, being arranged to line up in rows in a circumferential direction and constitute a second coil-end portion 36b.

At the front end of the stator core 15, end portions 42b of the second segments 42 extending outwards from the front end from the second positions within the first slots 15a are joined by welding, soldering, etc., to end portions 41b of the first segments 41 extending outwards from the front end from the first positions within the second slots 15a three slots away from the first slots 15a in the counterclockwise direction in FIG. 2, and end portions 42b of the second segments 42 extending outwards from the front end from the fourth positions within the first slots 15a are joined by welding, soldering, etc., to end portions 41b of the first segments 41 extending outwards from the front end from the third positions within the second slots 15a three slots away from the first slots 15a in the clockwise direction in FIG. 2. The joint portions formed by joining the end portions 42b of the second segments 42 extending outwards from the front end from the second positions within the slots 15a to the end portions 41b of the first segments 41 extending outwards from the front end from the first positions within the slots 15a and the joint portions formed by joining the end portions 42b of the second segments 42 extending outwards from the front end from the fourth positions within the slots 15a to the end portions 41b of the first segments 41 extending outwards from the front end from the third positions within the slots 15a line up radially, are arranged to line up in rows in a circumferential direction and constitute a first coil-end portion 36a.

The method of winding one phase (the X phase) of the stator winding 36 will now be explained with reference to FIGS. 4 to 6. Moreover, in each of the figures, electric conductors disposed on the outermost circumference in a radial direction are represented by double-dotted chain lines, electric conductors disposed in the second position from the outer circumference in the radial direction are represented by solid lines, electric conductors disposed in the third position from the outer circumference in the radial direction are represented by broken lines, and electric conductors disposed in the fourth position from the outer circumference in the radial direction are represented by single-dotted chain lines. Furthermore, the upper level represents the second coil-end portion 36b composed of arranged turn portions, and the lower level represents the first coil-end portion 36a composed of arranged joint portions. The horizontal row of numbers in the center of each diagram are slot numbers.

First, as shown in FIG. 4, the first and second segments 41 and 42 are inserted into every third slot from slot number 1. In the first coil-end portion 36a, the end portions 42b of the second segments 42 extending outwards from the second positions within the first slots 15a are joined to the end portions 41b of the first segments 41 extending outwards from the first positions of the second slots 15a three slots away in the counterclockwise direction in FIG. 2, and end portions 42b of the second segments 42 extending outwards from the fourth positions of the first slots 15a are joined to end portions 41b of the first segments 41 extending outwards from the third positions of the second slots 15a three slots away in the clockwise direction in FIG. 2. Then, the turn portions 41c of the first segment 41 inserted into slot numbers 1 and 34 and the turn portions 41c of the first segment 41 inserted into slot numbers 1 and 4 are both cut.

In this manner, a lap-wound first winding sub-portion 361 is formed having two turns per slot. At the same time, a lap-wound second winding sub-portion 362 is formed having two turns per slot as shown in FIG. 5.

As shown in FIG. 6, the first and second winding sub-portions 361 and 362 are joined (by a bridging connection) by welding, soldering, etc., a second end portion 361b of the first winding sub-portion 361 to a second end portion 362b of the second winding sub-portion 362 to form one phase of the stator winding 36, the phase having four turns. A first end portion 361a of the first winding sub-portion 361 and a first end portion 362a of the second winding sub-portion 362 become a lead wire (O) and a neutral point (N) respectively.

Moreover, the cut ends of the two first segments 41 correspond to the end portions 361a, 361b, 362a, and 362b of the first and second winding sub-portions 361 and 362, respectively. Furthermore, the joint portion formed by joining the second end portion 361b of the first winding sub-portion 361 to the second end portion 362b of the second winding sub-portion 362 constitutes a bridging connection connecting portion (C).

In addition, two other phases (Y and Z) of the stator winding 36 are offset by one slot and manufactured similarly.

Then, the three phases of the stator winding 36 are formed into an alternating current connection by connecting the neutral points (N) of each phase of the stator winding 36 to each other. In addition, the lead wires (O) of the stator winding 36 are connected to the rectifier 12 as shown in FIG. 7.

Now, because the end portions 361a and 361b of the first winding sub-portion 361 and the end portions 362a and 362b of the second winding sub-portion 362 are obtained by cutting the turn portions 41c of first segments 41, the segments having the end portions 361a and 361b of the first winding sub-portion 361 and the end portions 362a and 362b of the second winding sub-portion 362 are different from the other first segments 41 and second segments 42. In other words, each phase of the stator winding 36 has four differently-shaped segments spread over a pitch of two magnetic poles. After the turn portions 41c of some of the first segments 41 are cut, these differently-shaped segments are formed into bridging connections or three-phase alternating current connections, or connected to the rectifier 12. In addition, the bridging connection connecting portion (C) between the second end portion 361b of the first winding sub-portion 361 and the second end portion 362b of the second winding sub-portion 362 is positioned radially outside the second coil-end portion 36b and is lower than the height of the second coil-end portion 36b as shown in FIG. 8.

In an automotive alternator constructed in this manner, current is supplied to the rotor coil 13 from a battery (not shown) by means of the brushes 10 and the slip rings 9, and the magnetic flux is generated. The claw-shaped magnetic poles 22 of one pole core 20 are magnetized to N polarities by the magnetic flux, and the claw-shaped magnetic poles 23 of the other pole core 21 are magnetized to S polarities. On the other hand, the rotational torque of the engine is transmitted to the shaft 6 by means of the belt and the pulley 4, and the rotor 7 is rotated. Thus, a rotating magnetic field is imparted to the stator winding 36 and electromotive force is generated in the stator winding 36. This alternating electromotive force is rectified to direct current by means of the rectifier 12, its voltage is regulated by the regulator 18, and the battery is recharged.

At the rear end, external air is sucked in by rotation of the fans 5 from the air intake openings 2a disposed opposite the heat sink 19 of the rectifier 12 and the heat sink 17 of the regulator 18, respectively, flowing along the axis of the shaft 6, cooling the rectifier 12 and the regulator 18, and is then deflected centrifugally by the fans 5, cooling the second coil-end portion 36b of the stator winding 36 before being discharged to the outside through the air discharge openings 2b. On the other hand, at the front end, external air is sucked in axially by rotation of the fans 5 from the air intake openings 1a, and is then deflected centrifugally by the fans 5, cooling the first coil-end portion 36a of the stator winding 36 before being discharged to the outside through the air discharge openings 1b.

In this manner, according to Embodiment 1, each phase of the stator winding 36 is constructed by forming a bridge connection between the first and second winding sub-portions 361 and 362, each constituting two turns of a lap winding per circumnavigation around the stator core, and differently-shaped segments constituting the bridging connection connecting portion (C) between the first and second winding sub-portions 361 and 362, the lead wire (O), and the neutral point (N) are disposed in a portion of the second coil-end portion 36b extending over a pitch of two magnetic poles. Thus, the four segments to which stresses such as twisting, pulling, etc., are applied during subsequent processing are distributed such that two segments are disposed in one slot 15a and one segment each is disposed in two slots 15a. In other words, the four segments to which stresses are applied during subsequent processing are spread over three slots, and when formed into bridging connections or three-phase alternating current connections or connected to the rectifier after the turn portions 41c and 42c of some of the first segments 41 and some of the second segments 42 are cut, the risk of the insulation on the electric conductors in the slots 15a or the insulation on the electric conductors constituting the coil ends being damaged is reduced even if twisting, pulling, etc., are applied to the segments. As a result, the occurrence of short circuiting is suppressed and a high-quality stator 35 is obtained.

Furthermore, because the first winding sub-portion 361 and the second winding sub-portion 362 are only shifted by three slots and are formed in an identical shape, as shown in FIGS. 4 and 5, the processing jig for the lead wire (O) and the neutral point (N) can be used for both, enabling productivity to be increased.

Because the bridging connection connecting portion (C) between the first and second winding sub-portions 361 and 362 is disposed in a lower position than the height of the second coil-end portion 36b, the bridging connection connecting portion (C) does not protrude axially outside the second coil-end portion 36b, thereby reducing wind flow resistance on the fan discharge side and enabling rear-end-cooled internal parts such as the rectifier 12 and the regulator 18 to be effectively cooled.

Because the bridging connection connecting portion (C) between the first and second winding sub-portions 361 and 362 is positioned radially outside the second coil-end portion 36b, the radially inner shape of the second coil-end portion 36b can be flattened all along the circumferential direction. As a result, unpleasant high-order interference noise generated between the fans 5 and the second coil-end portion 36b and between the rotor 7 and the second coil-end portion 36b can be minimized, reducing wind noise.

In addition, because the turn portions 41c and 42c of some of the first and second segments 41 and 42 are arranged to line up in rows in a circumferential direction without crossing each other radially, the height of the second coil-end portion 36b is reduced. As a result, wind flow resistance on the fan discharge side is reduced, enabling rear-end-cooled internal parts to be effectively cooled.

Embodiment 2

Figure 9:
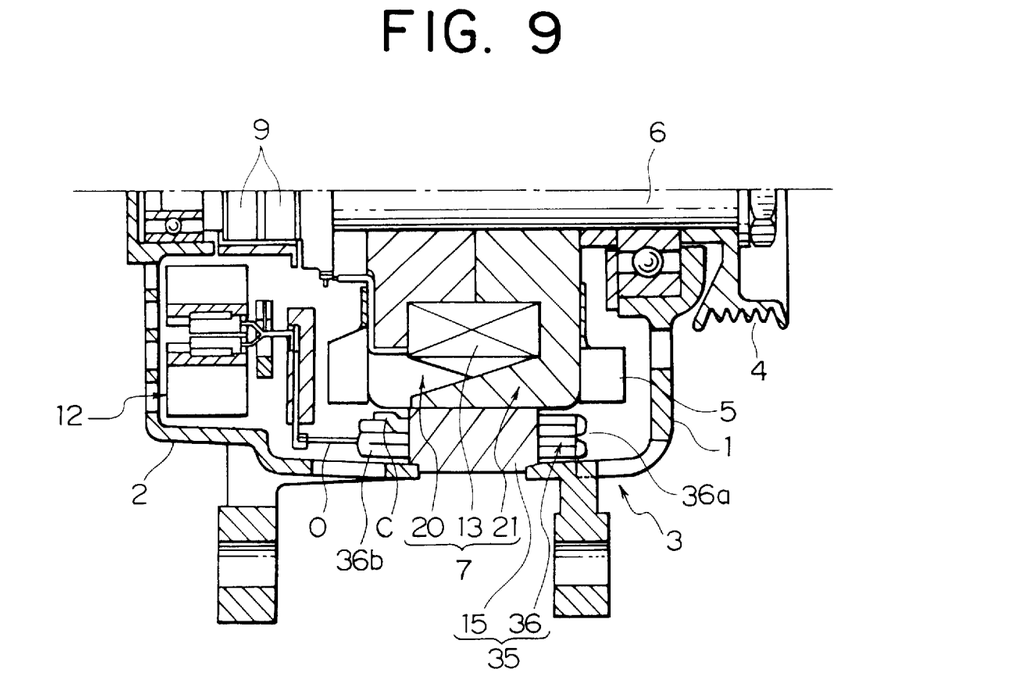
FIG. 9 is a cross section showing construction of an automotive alternator using a stator according to Embodiment 2 of the present invention.

In Embodiment 1 above, the bridging connection connecting portion (C) between the first and second winding sub-portions 361 and 362 is positioned radially outside the second coil-end portion 36b, but in Embodiment 2, the bridging connection connecting portion (C) between the first and second winding sub-portions 361 and 362 is positioned radially inside the second coil-end portion 36b as shown in FIG. 9.

In this case, the insulating space between the stator winding 36 and the brackets 1 and 2 is enlarged in proportion to the space vacated by the bridging connection connecting portion (C) radially outside the second coil-end portion 36b, enabling the prevention of short circuiting between the stator winding 36 and the brackets 1 and 2.

In addition, the space between the stator winding 36 and the brackets 1 and 2 can be reduced in proportion to the space vacated by the bridging connection connecting portion (C) radially outside the second coil-end portion 36b, enabling the alternator to be made more compact.

Embodiment 3

Figure 10:
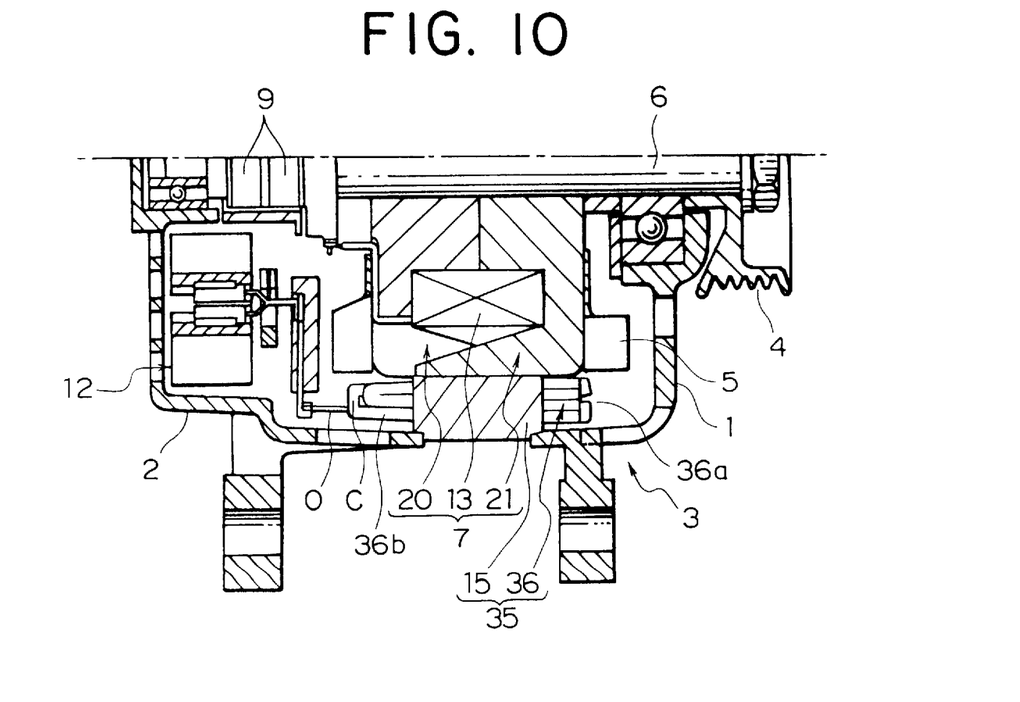
FIG. 10 is a cross section showing construction of an automotive alternator using a stator according to Embodiment 3 of the present invention.

In Embodiment 1 above, the bridging connection connecting portion (C) between the first and second winding sub-portions 361 and 362 is positioned radially outside the second coil-end portion 36b, but in Embodiment 3, the bridging connection connecting portion (C) between the first and second winding sub-portions 361 and 362 is positioned axially outside an apex portion of the second coil-end portion 36b as shown in FIG. 10.

In this case, short circuiting between the stator winding 36 and the brackets 1 and 2 can be reliably prevented and the alternator can be made more compact due to the absence of the bridging connection connecting portion (C) radially outside the second coil-end portion 36b.

In addition, unpleasant high-order interference noise generated between the fans 5 and the second coil-end portion 36b and between the rotor 7 and the second coil-end portion 36b can be reduced due to the absence of the bridging connection connecting portion (C) radially outside the second coil-end portion 36b, thereby reducing wind noise.

Embodiment 4

Figure 11:
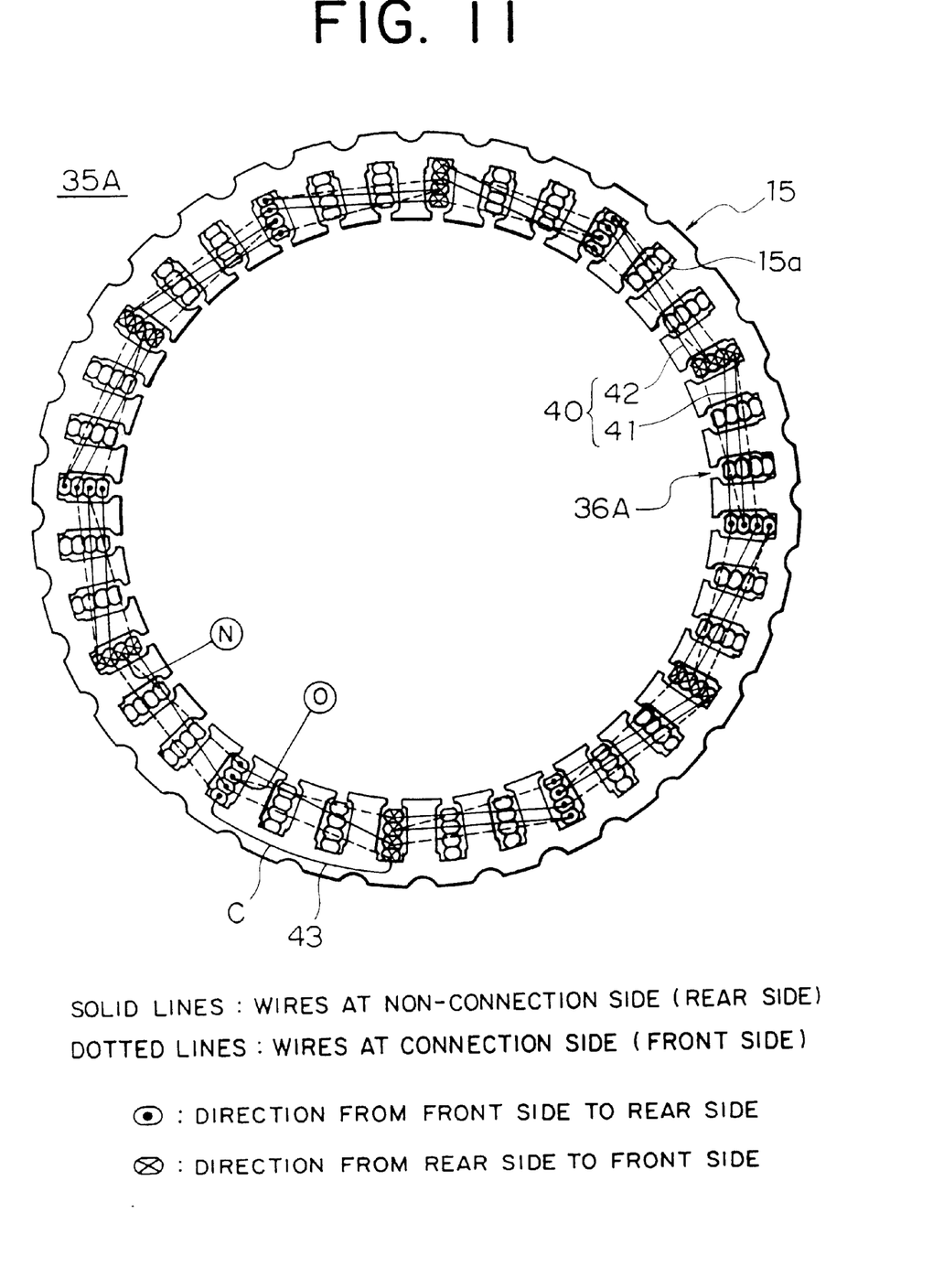
FIG. 11 is a plan view from a rear end showing connection of one phase of a stator winding in a stator according to Embodiment 4 of the present invention.

FIG. 11 is a plan view showing connection of one phase of a stator winding in a stator for an automotive alternator according to Embodiment 4 of the present invention.

As shown in FIG. 11, in a stator winding 36A of a stator 35A according to Embodiment 4, in adjacent first and second sets of slots 15a three slots apart, the second segments 42 are inserted from the rear end into the second positions and fourth positions of the first and second sets of slots, and in addition, U-shaped segments 43 are inserted from the rear end into the third positions in both slots of the first set of slots 15a and into the first positions in both slots of the second set of slots 15a. Then, a turn portion of the U-shaped segment 43 inserted into the third positions in both slots of the first set of slots 15a is cut, and the cut ends constitute a neutral point (N) and a lead wire (O), respectively. In addition, the turn portion of the U-shaped segment 43 inserted into the first positions in both slots of the second set of slots 15a constitutes a bridging connection connecting portion (C) between first and second winding sub-portions.

Moreover, the rest of the construction is the same as in Embodiment 1 above.

According to Embodiment 4, because the bridging connection connecting portion (C) is constituted by the turn portion of the U-shaped segment 43, only one segment needs to be cut, eliminating the bridging connection operation. As a result, the productivity of the stator can be improved, and the occurrence of short circuiting resulting from cutting of the segments or stress during formation of the bridging connection can be suppressed.

Embodiment 5

Figure 12:
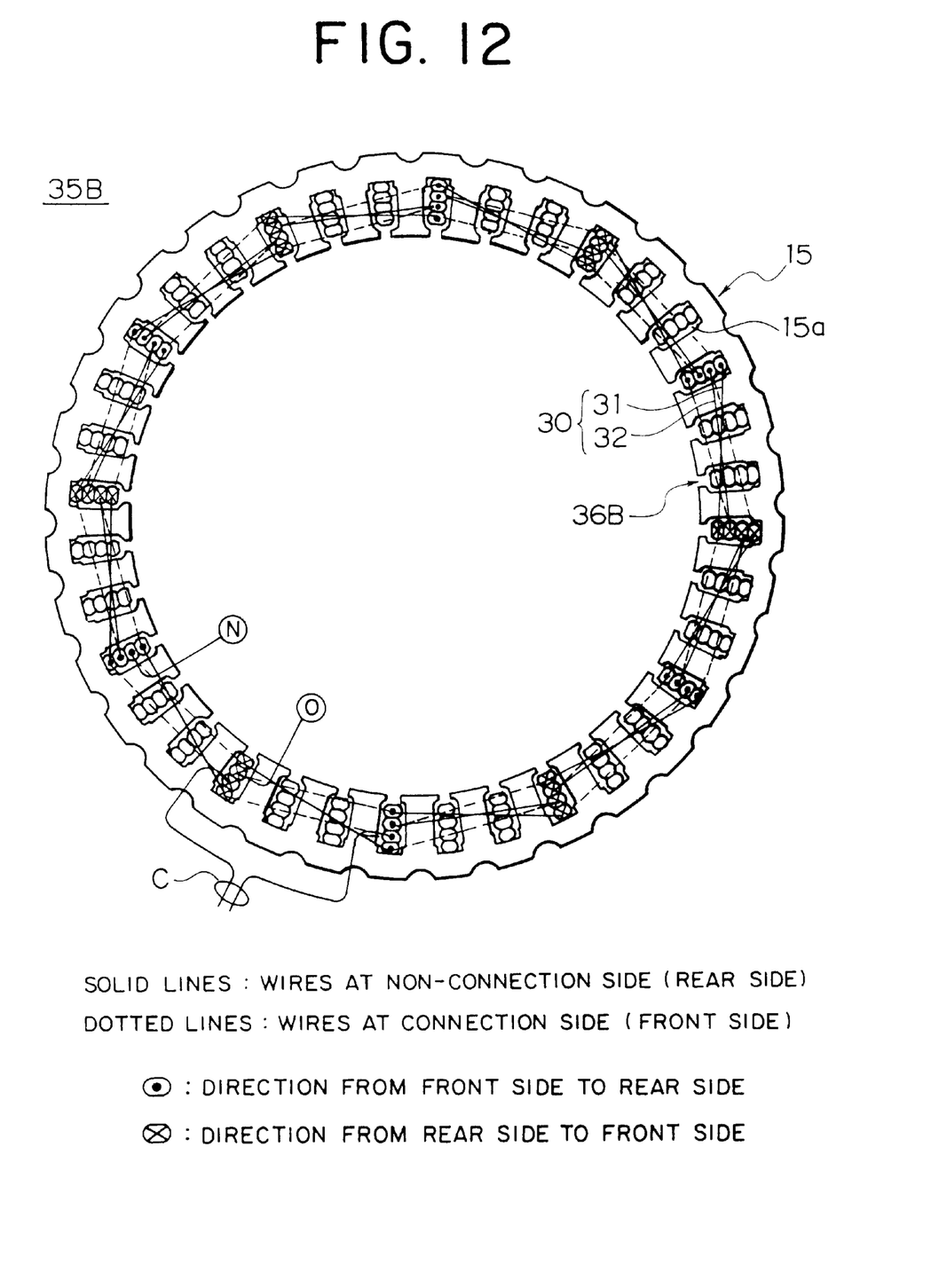
FIG. 12 is a plan view from a rear end showing connection of one phase of a stator winding in a stator according to Embodiment 5 of the present invention.

FIG. 12 is a plan view showing connection of one phase of a stator winding in a stator for an automotive alternator according to Embodiment 5 of the present invention.

As shown in FIG. 12, in a stator winding 36B of a stator 35B according to Embodiment 5, small segments 32 are inserted from the rear end into the second positions and third positions of first and second slots 15a three slots apart, and in addition, large segments 31 are inserted from the rear end into the first positions and fourth positions of first and second slots 15a three slots apart. Then, end portions 32b of the small segments 32 extending outwards from the second positions of the first slots 15a are joined to end portions 31b of the large segments 31 extending outwards from the first positions of the second slots 15a three slots away in the clockwise direction in FIG. 12, and end portions 31b of the large segments 31 extending outwards from the fourth positions of the first slots 15a are joined to end portions 32b of the small segments 32 extending outwards from the third positions of the second slots 15a three slots away in the clockwise direction in FIG. 12. Then, in adjacent first and second sets of slots 15a three slots apart, the turn portions of each of the small segments 32 are cut. In addition, the cut ends of the small segments 32 housed in the second positions of the slots 15a are joined to each other to form a bridging connection connecting portion (C). Moreover, the cut ends of the small segments 32 housed in the third positions of the slots 15a constitute a lead wire (O) and a neutral point (N), respectively.

Thus, each phase of the stator winding 36B is constructed by forming a bridging connection between first and second winding subportions consisting of two turns of lap winding per slot.

In this manner, differently-shaped segments constituting the bridging connection connecting portion (C), the lead wire (O), and the neutral point (N) extend over a pitch of two magnetic poles in each phase of the stator winding 36B, and because the first and second winding subportions are only shifted by three slots and are formed in an identical shape, the same effects as in Embodiment 1 can also be achieved in Embodiment 5.

Furthermore, although not explained here, because the bridging connection connecting portion (C) between the first and second winding sub-portions is disposed in a lower position than the height of the second coil-end portion, the bridging connection connecting portion (C) does not protrude axially outside the second coil-end portion, reducing wind flow resistance on the fan discharge side, and enabling rear-end-cooled internal parts such as the rectifier 12 and the regulator 18 to be effectively cooled.

Because the bridging connection connecting portion (C) between the first and second winding sub-portions is positioned radially outside the second coil-end portion, the radially inner shape of the second coil-end portion can be flattened all along the circumferential direction. As a result, unpleasant high-order interference noise generated between the fans 5 and the second coil-end portion and between the rotor 7 and the second coil-end portion can be minimized, thereby reducing wind noise.

Moreover, each of the above embodiments has been explained using a three-phase alternator having one slot per pole per phase, but the present invention can naturally be applied to a three-phase alternator having two or more slots per pole per phase, or any other polyphase alternator, such as a six-phase alternator for example.

Furthermore, the segments 30 and 40 in each of the above embodiments used an electric conductor having a rectangular cross section, but the same effects can be achieved using an electric conductor having a circular cross section for the segments.

In each of the above embodiments, the bridging connection connecting portion (C) between the first and second winding sub-portions is disposed in the second coil-end portion 36b, but the same effects can be achieved if the bridging connection connecting portion (C) between the first and second winding sub-portions is disposed in the first coil-end portion 36a.

The present invention is constructed in the above manner and exhibits the effects described below.

According to one aspect of the present invention, there is provided a stator for an automotive alternator including:

a stator core having a number of slots; and a polyphase stator winding installed in the slots, the stator winding being constructed by joining a number of segments of electric conductor, the stator winding including:

a second coil-end portion formed at a first axial end of the stator core, the second coil-end portion being constituted by turn portions of the segments; and a first coil-end portion formed at a second axial end of the stator core, the first coil-end portion being constructed by joining end portions of the segments so as to form a lap winding, each phase of the stator winding being constructed by forming a bridging connection between first and second winding sub-portions each constituting two turns of a lap winding per circumnavigation of the stator core, and the segments of each phase of the stator winding constituting a bridging connection connecting portion between the first and second winding sub-portions, a lead point, and a neutral point being disposed in a portion extending over a pitch of two magnetic poles of a selected coil-end portion selected from the first and second coil-end portions, thereby providing a stator for an automotive alternator enabling the suppression of damage to the insulation of electric conductors which occurs during formation of the bridging connections and the three-phase alternating connection and the suppression of deterioration in quality due to short circuiting.

Because the first and second winding sub-portions may also have an identical shape, productivity is improved by enabling common use of the processing jig for the lead wire end and the neutral point end.

Because at least one bridging connection connecting portion may also be disposed in a position lower than the height of the selected coil-end portion, wind flow resistance on the fan discharge side is reduced, enabling internal parts to be effectively cooled.

Because at least one bridging connection connecting portion may also be disposed radially outside the selected coil-end portion, unpleasant high-order interference noise generated between the fans and the coil-end portion and between the rotor and the coil-end portion can be minimized, thereby reducing wind noise.

Because at least one bridging connection connecting portion may also be disposed radially inside the selected coil-end portion, the space between the stator winding and the brackets is enlarged, enabling insulation to be improved, and the alternator can be made more compact by reducing the space between the stator winding and the brackets.

Because at least one bridging connection connecting portion may also be disposed axially outside an apex portion of the selected coil-end portion, insulation between the stator winding and the brackets is ensured, and unpleasant high-order interference noise generated between the fans and the coil-end portion and between the rotor and the coil-end portion is reduced.

Because at least one bridging connection connecting portion may also be composed of a U-shaped segment, the bridging connection operation can be alleviated, improving productivity, and the occurrence of short circuiting as a result of the bridging connection operation can be suppressed.

What is claimed is:

1. A stator for an automotive alternator comprising:

a stator core having a number of slots; and a polyphase stator winding installed in said slots, said stator winding being constructed by joining a number of segments of an electric conductor, said stator winding comprising:

a second coil-end portion formed at a first axial end of said stator core, said second coil-end portion being constituted by turn portions of said segments; and a first coil-end portion formed at a second axial end of said stator core, said first coil-end portion being constructed by joining end portions of said segments so as to form a lap winding, each phase of said stator winding being constructed by forming a bridging connection between first and second winding sub-portions each constituting two turns of a lap winding per circumnavigation of said stator core, and said segments of each phase of said stator winding constituting a bridging connection connecting portion between said first and second winding sub-portions, a lead point, and a neutral point being disposed in a portion extending over a pitch of two magnetic poles of a selected coil-end portion selected from said first and second coil-end portions.

2. The stator for an automotive alternator according to claim 1 wherein at least one bridging connection connecting portion is disposed radially outside said selected coil-end portion.

3. The stator for an automotive alternator according to claim 1 wherein at least one bridging connection connecting portion is disposed radially inside said selected coil-end portion.

4. The stator for an automotive alternator according to claim 1 wherein at least one bridging connection connecting portion is disposed axially outside an apex portion of said selected coil-end portion.

5. The stator for an automotive alternator according to claim 1 wherein at least one bridging connection connecting portion is composed of a U-shaped segment.

6. The stator for an automotive alternator according to claim 1 wherein at least one bridging connection connecting portion is disposed in a position lower than a height of said selected coil-end portion.

7. The stator for an automotive alternator according to claim 6 wherein at least one bridging connection connecting portion is disposed radially outside said selected coil-end portion.

8. The stator for an automotive alternator according to claim 6 wherein at least one bridging connection connecting portion is disposed radially inside said selected coil-end portion.

9. The stator for an automotive alternator according to claim 1 wherein said first and second winding sub-portions have an identical shape.

10. The stator for an automotive alternator according to claim 9 wherein at least one bridging connection connecting portion is disposed radially outside said selected coil-end portion.

11. The stator for an automotive alternator according to claim 9 wherein at least one bridging connection connecting portion is disposed radially inside said selected coil-end portion.

12. The stator for an automotive alternator according to claim 9 wherein at least one bridging connection connecting portion is disposed axially outside an apex portion of said selected coil-end portion.

13. The stator for an automotive alternator according to claim 9 wherein at least one bridging connection connecting portion is composed of a U-shaped segment.

14. The stator for an automotive alternator according to claim 9 wherein at least one bridging connection connecting portion is disposed in a position lower than a height of said selected coil-end portion.

15. The stator for an automotive alternator according to claim 14 wherein at least one bridging connection connecting portion is disposed radially outside said selected coil-end portion.

16. The stator for an automotive alternator according to claim 14 wherein at least one bridging connection connecting portion is disposed radially inside said selected coil-end portion.

* * * * *